(12) United States Patent
Kimerling et al.

(10) Patent No.: US 6,944,368 B2
(45) Date of Patent: Sep. 13, 2005

(54) WAVEGUIDE-TO-SEMICONDUCTOR DEVICE COUPLER

(75) Inventors: Lionel C. Kimerling, Concord, MA (US); Kazumi Wada, Lexington, MA (US); Shoji Akiyama, Brighton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 10/733,977

(22) Filed: Dec. 11, 2003

(65) Prior Publication Data

US 2004/0179782 A1 Sep. 16, 2004

Related U.S. Application Data

(60) Provisional application No. 60/434,221, filed on Dec. 17, 2002.

(51) Int. Cl.[7] .............................. G02B 6/26; G02B 6/42
(52) U.S. Cl. .............................. 385/28; 385/14; 385/15; 385/27; 385/39; 385/43
(58) Field of Search ............................... 385/11, 14, 27, 385/28, 31, 49, 88, 92, 129, 130–132, 12, 15, 43

(56) References Cited

U.S. PATENT DOCUMENTS

| 5,107,316 | A | | 4/1992 | Jelley et al. |
| 6,778,723 | B1 | * | 8/2004 | Yang ............................ 385/16 |
| 2001/0021299 | A1 | * | 9/2001 | Hamamoto ................. 385/131 |
| 2002/0154848 | A1 | * | 10/2002 | Shimonaka et al. .......... 385/14 |

FOREIGN PATENT DOCUMENTS

| JP | 62011810 | 1/1987 |
| SU | 923335 | 10/1982 |

OTHER PUBLICATIONS

"Development and Application of flux–paste for laser welding of aluminum alloys," Cretteur et al. *Welding International.* 2000.
"Theoretical study on the coupling of two–dimensional Gaussian beam to a dielectric slab waveguide," Nishimura et al. *Transactions of the Institute of Electronics and Communication Engineers of Japan.* May 1984.
"Fresnel–like behavior of guided waves," Shen et al. *Journal of Optical Society of America.* Nov. 1987.
"Ultrafast photon drag detector for intersubband spectroscopy," Sigg et al. *Superlattices and Microstructures.* 1996. vol. 19, No. 2.
"Critical–Incidence Coupling to intersubband Excitations," Keilmann et al. *Solid State Communications.* 1994. vol. 92, No. 3.
"Efficient high–speed near–infrared Ge photodetectors integrated on Si Substrates," Colace et al. *Applied Physics Letters.* 2000. vol. 76, No. 10.
"Optoelectronic Conversion through 850nm Band Single Mode $Si_3N_4$ Photonic Waveguides for Si–On–Chip Integration," Matsuura et al. *Device Research Conference, Conference Proceedings.* Santa Barbara, CA. Jun. 2002.
"Near and mid infrared silicon/germanium based photodetection," Presting. *Thin Solid Films.* 1998. vol. 321.
"FDTD Analysis of a Polarization Conversion Waveguide with a Single Sloped Sidewall," Yamauchi et al. *Optical Society of America.* Jun. 2003.

* cited by examiner

Primary Examiner—Frank G. Font
Assistant Examiner—Derek L. Dupuis
(74) Attorney, Agent, or Firm—Gauthier & Connors LLP

(57) ABSTRACT

A waveguide-semiconductor coupling device includes a waveguide structure that includes a multimode interferometer (MMI) structure so as to minimize the reflections of TE modes in the coupling device. A mesa structure is coupled to the waveguide structure so as to minimize the reflections of TM modes in the coupling device.

16 Claims, 6 Drawing Sheets

WAVEGUIDE-TO-SEMICONDUCTOR DEVICE COUPLER

PRIORITY INFORMATION

This application claims priority from provisional application Ser. No. 60/434,221 filed Dec. 17, 2002, which is incorporated herein by reference in its entirety.

BACKGROUND OF THE INVENTION

The invention relates to the field of waveguide-to-semiconductor coupling devices, and in particular a waveguide-to-semiconductor device having waveguide/semiconductor interface structures with Brewster angles for TM modes and multimode interferometer (MMI) structures at a waveguide end for TE modes.

The low efficiency in waveguide-to-semiconductor coupling devices is a serious problem in photonics chips. A majority of waveguides are comprised of low index materials (SiNx: 2.2, SiOxNy: 1.5), while other standard semiconductor devices, such as detectors, modulators, emitter, and amplifier are comprised of high index structures (Ge: 4.2, Si:3.5, GaAs: 3.6). One example of inefficient coupling is between a Ge detector and waveguide. Approximately 40% of incident light is reflected between Ge and SiNx causing significant Fresnel loss. In most photonic applications, this amount of loss is unacceptable and very inefficient. In evanescent coupling the propagation velocity mismatch between the waveguide and Ge detector needs a long coupling length. A long coupling length would be inefficient in photonic applications because size is an essential factor that needs to be controlled for such applications to operate efficiently with minimum loss.

SUMMARY OF THE INVENTION

According to one aspect of the invention, there is provided a waveguide-semiconductor coupling device. The waveguide-semiconductor coupling device includes a waveguide structure that includes a multimode interferometer (MMI) structure so as to minimize the reflections of TE modes in the coupling device. A mesa structure is coupled to the waveguide structure so as to minimize the reflections of TM modes in the coupling device.

According to another aspect of the invention, there is provided a method of forming a waveguide-semiconductor coupling device. The method includes forming a waveguide structure that includes a multimode interferometer (MMI) structure so as to minimize the reflections of TE modes in the coupling device. Also, the method includes forming a mesa structure that is coupled to the waveguide structure so as to minimize the reflections of TM modes in the coupling device.

DETAILED DESCRIPTION OF THE INVENTION

The invention attempts to address the inefficiency presented by waveguide-semiconductor coupling devices by improving its efficiency. By forming an appropriate waveguide/semiconductor interface, one can control the Brewster angles for TM modes which will minimize the reflection of these modes. Moreover, the incorporation of a multimode interferometer (MMI) in the waveguide can be used to minimize the reflection of TE modes in a waveguide-semiconductor coupling device. The combination of the improved waveguide/semiconductor interface and the incorporation of a MMI structure in the waveguide improves significantly over other standard waveguide-semiconductor coupling devices.

Figure 1:
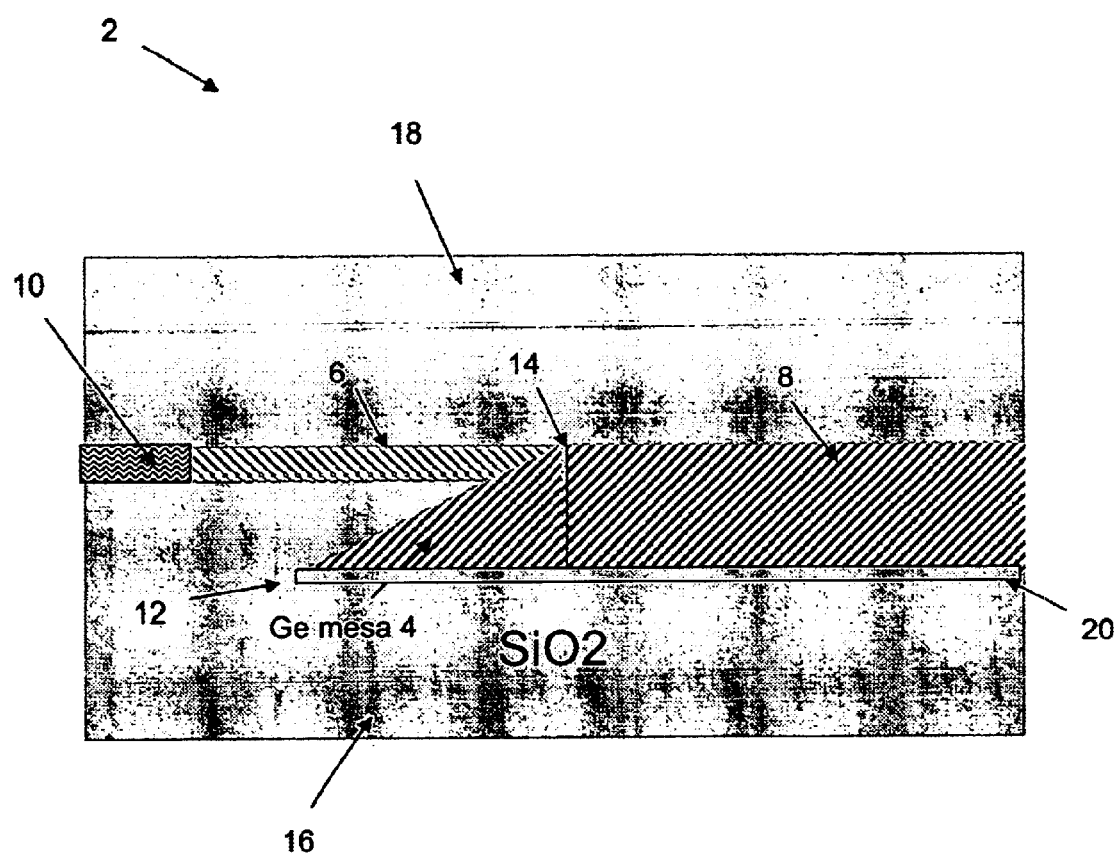
FIG. 1 is a schematic diagram of a waveguide-semiconductor coupling device having a Ge mesa.

FIG. 1 is a schematic diagram of a waveguide-semiconductor coupling device 2 having a Ge mesa 4. The waveguide-semiconductor coupling device 2 includes a SiNx waveguide 6, and a Ge detector 8. The SiNx waveguide 6 includes at its outer most end a polarization rotator 10 to rotate the polarization from TE to TM. Moreover, the SiNx waveguide 6 is coupled with the Ge mesa 4 at a Brewster angle. The Ge mesa 4 is coupled to the Ge detector 8. The SiNx waveguide 6, Ge mesa 4, and Ge detector 8 are all surrounded by SiO$_2$.

In this arrangement, the Brewster angle is defined as $$\tan^{-1}(n_D/n_{WG}) \qquad \text{Eq. 1}$$

where $n_D$ is the index of refraction of the Ge detector and $n_{WG}$ is the index of the waveguide. There is no reflection at the Brewster angle of 27.6° between the SiNx waveguide 6 and the Ge mesa 4 for TM modes. In addition, this arrangement demonstrates reduced reflection for Brewster angles at 27.6±10° for TM modes.

The Ge mesa 4 is formed using standard techniques in the art. Note that the Ge mesa 4 is formed with a tapered edge 12. This tapered edge 12 provides the means to control TM mode reflections. In addition, the Ge mesa 4 provides an interface between the SiNx waveguide 6 and the Ge detector 8 that efficiently limits the reflections of TM modes. The waveguide 6 is also tapered 14 at its end to form the Brewster angle necessary to limit reflections. The Ge mesa 4 is naturally formed in the selective growth of Ge epilayers on a Si layer 20 at least in UHV-CVD. Afterwards, the waveguide 6 materials are deposited and SiO$_2$ is deposited to form upper cladding 18 and lower cladding 16 on the formed waveguide 6 and Ge mesa 4.

The dimensions are typically 1 μm thick Ge mesa 4, 0.2 μm thick SiNx waveguide 6, 0.1 μm thick Si layer 20 below the Ge epilayers forming mesa 4, a few μm thick SiO$_2$ lower cladding 16, and about 1 μm thick SiO2 upper cladding 18. The Ge detector 8 is typically 2 μm wide and 10 μm long, and the SiNx waveguide 6 is 1 μm wide.

To obtain such Brewster angles the coupling between the waveguide 6 and the Ge mesa 4 are formed under various growth facets. In this case, grow facets of {111} and {001} can obtain an angle of approximately of 35°. Also, growth facets of {211} and {001} can obtain an angle of approximately 24° and growth facet of {001} can obtain an angle of 17.5°. These angles fall in the Brewster angle ±10°. Note that these near Brewster angles can be obtained by using other standard processing techniques known in the art.

Figures 2A, 2B:
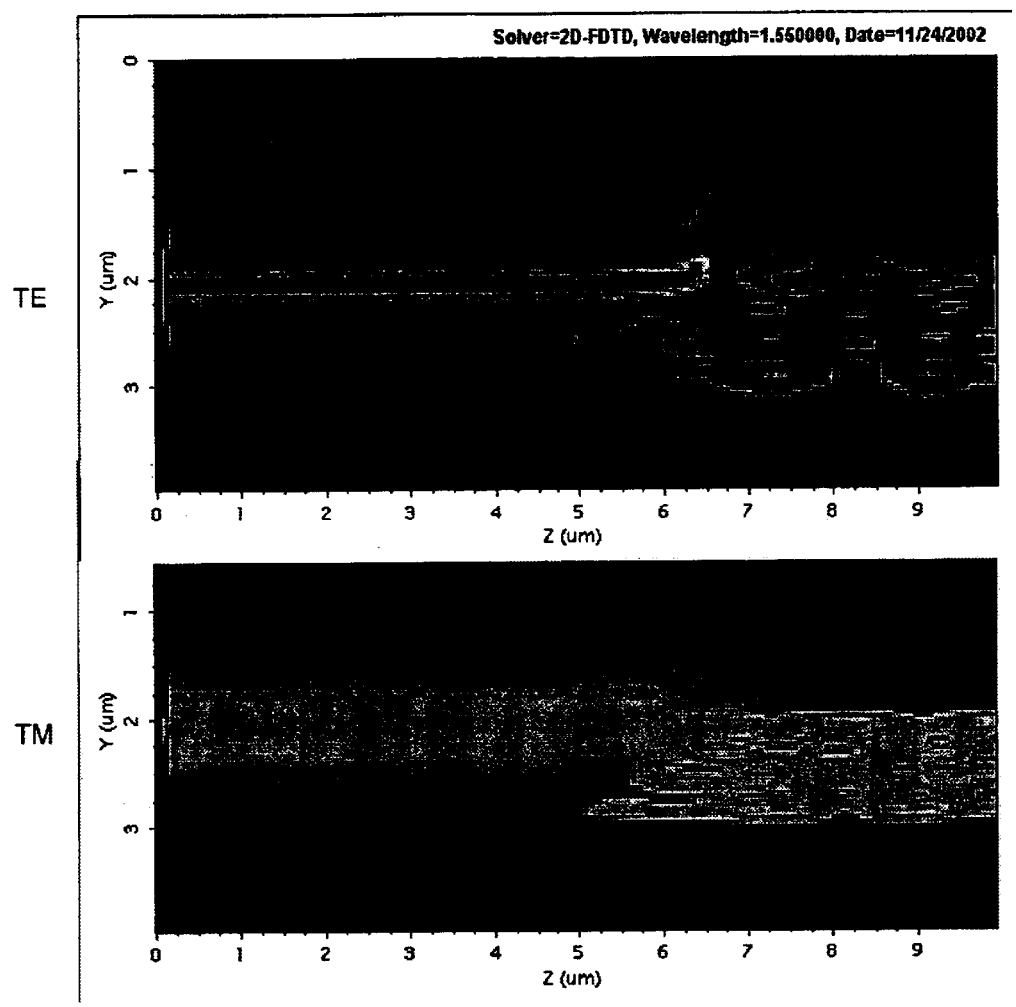
FIGS. 2A–2B are graphs demonstrating the reflections of TE and TM modes of the coupling device described in FIG. 1.

FIGS. 2A–2B are graphs demonstrating the reflections of TE and TM modes of the coupling device 2 described in FIG. 1. FIG. 2A shows the reflections of the TE modes in the coupling device 2. Note that the coupling device 2 exhibits high TE reflection. This is a problem because the TE reflections are significant even at the Brewster angle. The invention will address this issue more hereinafter. FIG. 2B shows the TM reflections in the coupling device 2. In this case, the reflections of TM modes are significantly lower which makes the structure a better coupling device because of this increase in coupling efficiency.

The coupling device 2 has demonstrated a clear promise of providing efficient coupling for TM modes, however, this is not the case for TE modes. The problems also lie with the SiNx waveguide 6 because the index mismatch generates modal mismatch and size mismatch making even poorer coupling efficiency for TE modes.

Figure 3:
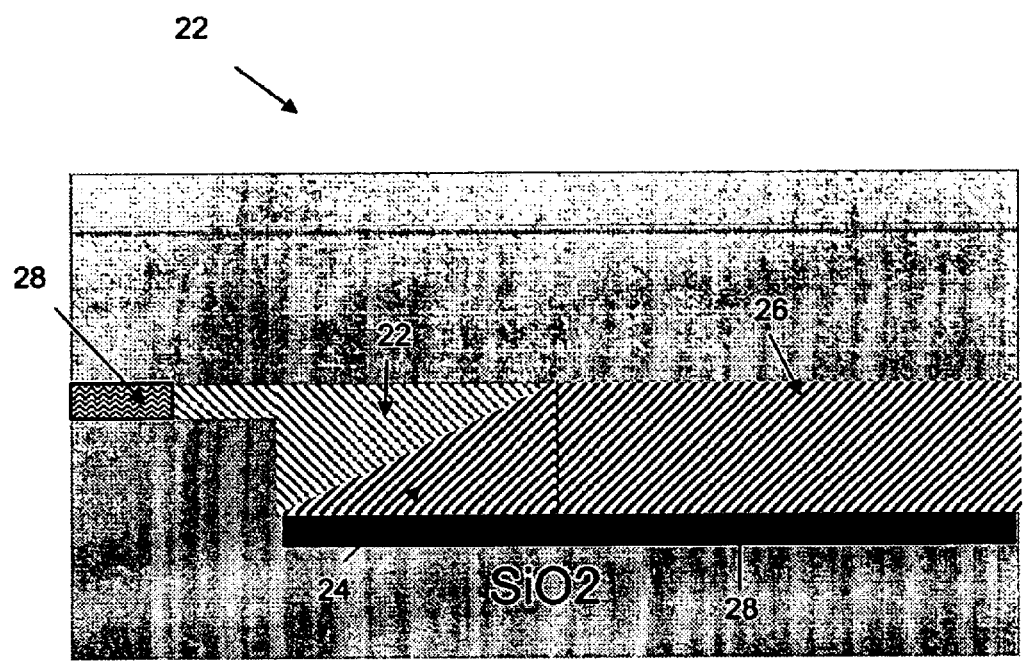
FIG. 3 is a schematic diagram of a waveguide-semiconductor coupling device using a SiNx waveguide that includes a multimode interferometer (MMI)

FIG. 3 is a schematic diagram of a waveguide-semiconductor coupling device 21 using a SiNx waveguide 22 that includes a multimode interferometer (MMI). In addition, the coupling device 21 includes a Ge mesa 24 and a Ge detector 26 that are formed on a Si layer 28, and is surrounded by SiO$_2$. The SiNx waveguide 22 also includes a polarization rotator 28 to rotate the polarization from TE to TM.

In forming the waveguide 22, the materials that are used to form a multimode interferometer are selectively incorporated with the materials used to form the waveguide 22. Afterwards, these materials are deposited on the Ge mesa 24 to form a SiNx reversed mesa. In particular, the SiNx reversed mesa is arranged so that a mode is pulled toward the Ge mesa 24 so as to further reduce reflections for TM modes. Moreover, the incorporation of the MMI materials does not degrade TM coupling efficiency.

Figure 4A:
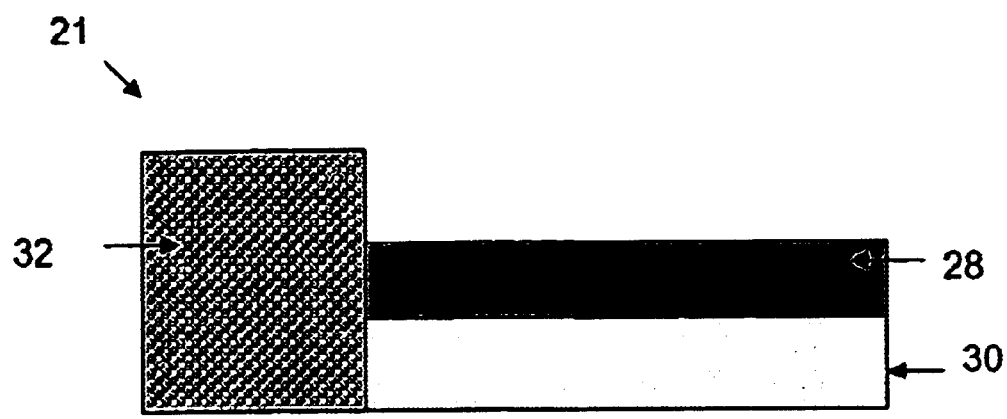
FIGS. 4A–4D are schematic diagrams illustrating fabrication steps to form the coupling device 20 shown in FIG. 3.
Figure 4B:
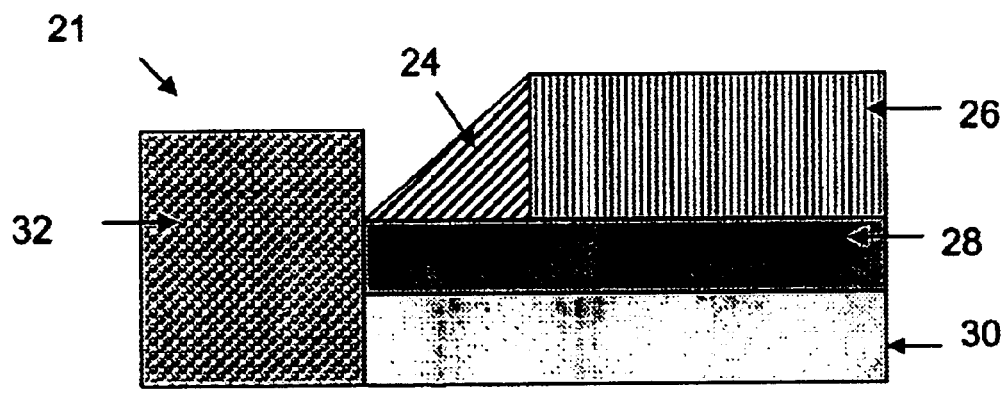
Figure 4C:
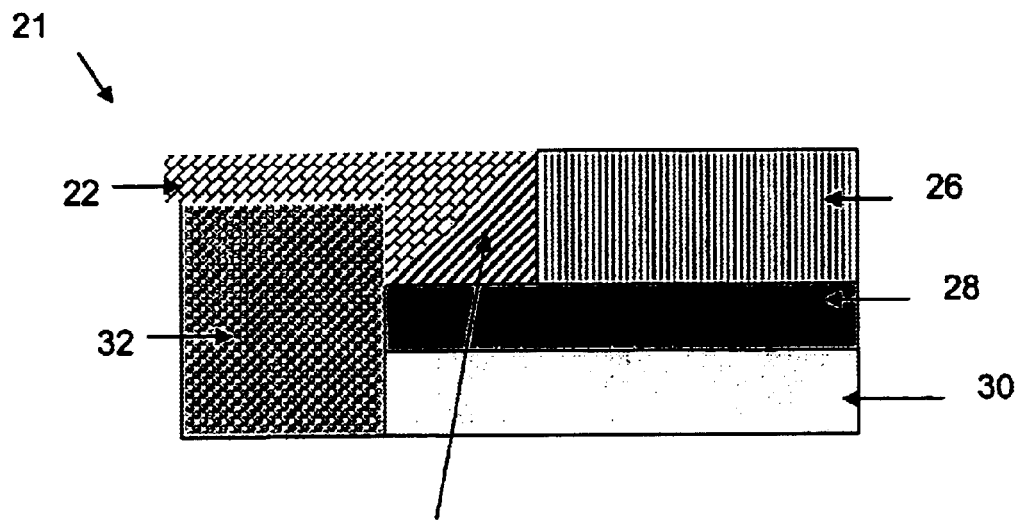
Figure 4D:
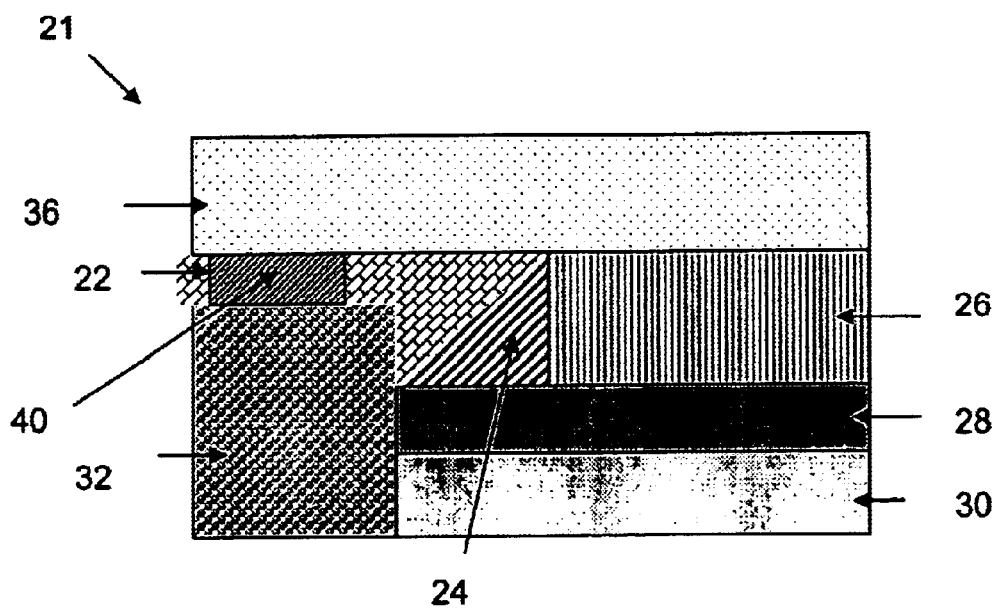

FIGS. 4A–4D are schematic diagrams illustrating fabrication steps to form the coupling device 21 shown in FIG. 3. FIG. 4A shows a SOI structure that includes a SiO$_2$ layer 30 and the Si layer 28. Note that the Si layer 28 should include crystalline Si for efficient growth of the crystalline Ge mesa layer 24. The SOI structure is etched with Si on all areas except those where Ge epilayers will be deposited to form the Ge mesa 24. Afterwards, a layer 32 of SiO$_2$ is deposited on the side exposed by Si etching. FIG. 4B shows that Ge epilayers are deposited on the Si layer 28 to form the mesa 24. The edge of mesa 24 is facetted with {111}, {311}, or the like planes to form the necessary Brewster angle described herein. Note the detector 26 is also formed on the Si layer 28. FIG. 4C shows the SiNx materials, which include the MMI structures, being deposited to form waveguide 22. In particular, the waveguide 22 is a SiNx mesa structure having tapered edge in the opposite direction of the Ge mesa 24. FIG. 4D shows a second layer (or upper layer) 36 of SiO$_2$ being deposited on so the coupling device 21 is enclosed by SiO$_2$. Furthermore, the polarization rotator 40 can be included at any point after the formation of the waveguide 22.

Figures 5A, 5B:
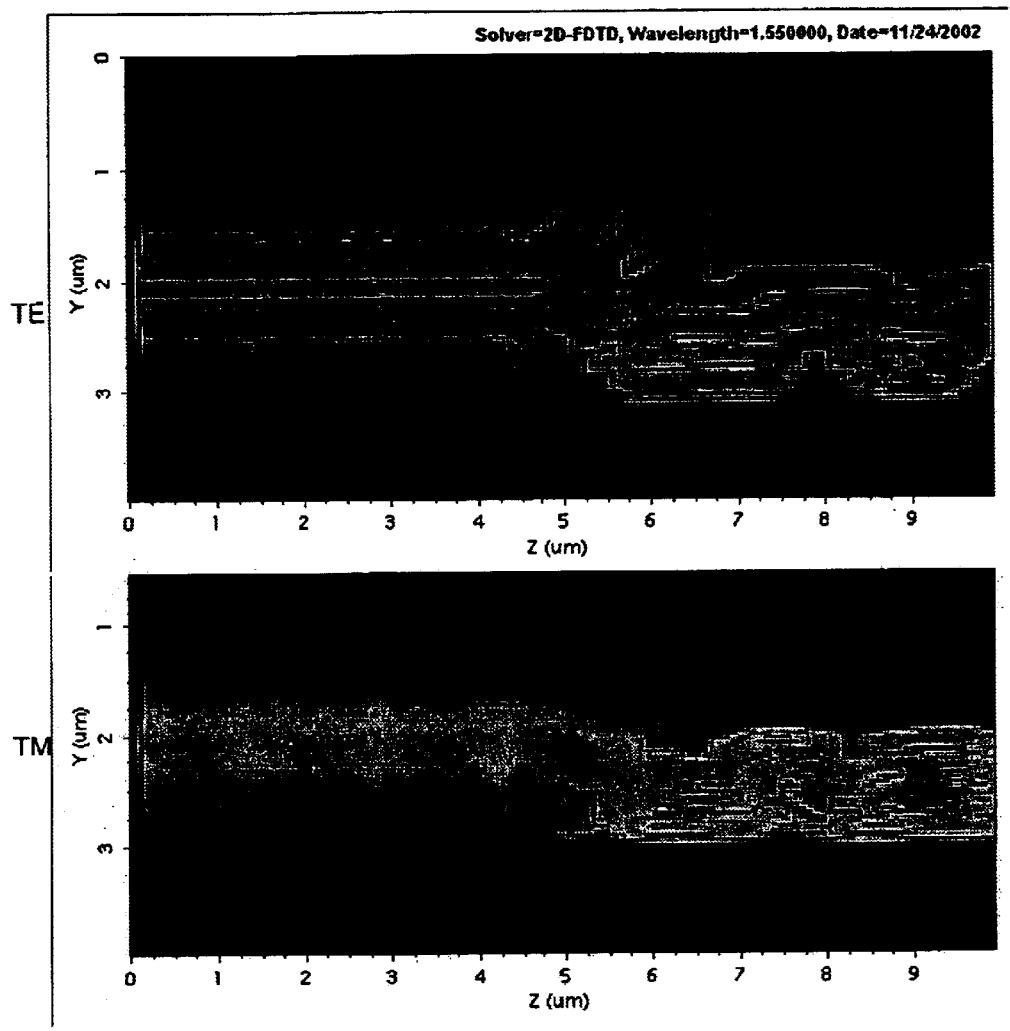
FIGS. 5A–5B are graphs demonstrating the reflections of TE and TM modes of the coupling described in FIG. 3.

FIGS. 5A–5B are graphs demonstrating the reflections of TE and TM modes of the coupling device 21 described in FIG. 3. FIG. 5A shows the reflections of the TE modes in the coupling device 20. Note that the coupling device 21 exhibits lower TE reflection, as compared to the coupling device 2 of FIG. 2. Therefore, the incorporation of MMI materials in the SiNx waveguide 22 increases the coupling efficiency of TE mode. FIG. 5B shows the TM reflections in the coupling device 21. In this case, the reflections of TM modes are similar to those shown in FIG. 2B. This illustrates that the incorporation of MMI in the SiNx waveguide 22 does not affect the coupling of TM modes.

The invention provides a coupling device that improves the coupling efficiency of both TE and TM modes.

Moreover, the invention can work in any material sets with index mismatch in conjunction with rotators to TM. The flexibility to form such devices allows them to be incorporated in optical chip sets without requiring sufficient difficulty.

Although the present invention has been shown and described with respect to several preferred embodiments thereof, various changes, omissions and additions to the form and detail thereof, may be made therein, without departing from the spirit and scope of the invention.

What is claimed is:

1. A waveguide-semiconductor coupling device comprising:

a waveguide structure that includes a multimode interferometer (MMI) structure so as to minimize the reflections of TE modes in said coupling device; and a mesa structure that is coupled to said waveguide structure so as to minimize the reflections of TM modes in said coupling device.

2. The waveguide-semiconductor coupling device of claim 1, wherein said mesa structure comprises Ge.

3. The waveguide-semiconductor coupling device of claim 2, wherein said mesa is coupled to a detector.

4. The waveguide-semiconductor coupling device of claim 3, wherein said detector comprises Ge.

5. The waveguide-semiconductor coupling device of claim 3, wherein said waveguide structure and said mesa structure are coupled at Brewster angles of the TM modes.

6. The waveguide-semiconductor coupling device of claim 5, where said Brewster angles are defined as $\tan^{-1}(n_D/n_{WG})$, where $n_D$ is the index of refraction of the Ge detector and $n_{WG}$ is the index of the waveguide structure.

7. The waveguide-semiconductor coupling device of claim 1, wherein said waveguide structure includes a polarization rotator.

8. The waveguide-semiconductor coupling device of claim 1, wherein said mesa structure is tapered.

9. A method of forming a waveguide-semiconductor coupling device comprising:

forming a waveguide structure that includes a multimode interferometer (MMI) structure so as to minimize the reflections of TE modes in said coupling device; and forming a mesa structure that is coupled to said waveguide structure so as to minimize the reflections of TM modes in said coupling device.

10. The method of claim 9, wherein said mesa structure comprises Ge.

11. The method of claim 10, wherein said mesa is coupled to a detector.

12. The method of claim 11, wherein said detector comprises Ge.

13. The method of claim 11, wherein said waveguide structure and said mesa structure are coupled at Brewster angles of the TM modes.

14. The method of claim 13, where said Brewster angles are defined as $\tan^{-1}(n_D/n_{WG})$, where $n_D$ is the index of refraction of the Ge detector and $n_{WG}$ is the index of the waveguide structure.

15. The method of claim 9, wherein said waveguide structure includes a polarization rotator.

16. The method of claim 9, wherein said mesa structure is tapered.

* * * * *